United States Patent
Paulson et al.

(10) Patent No.: US 11,674,630 B2
(45) Date of Patent: Jun. 13, 2023

(54) METHOD AND APPARATUS TO DETECT FLAWS IN METALLIC PIPE

(71) Applicant: PURE TECHNOLOGIES LTD., Calgary (CA)

(72) Inventors: Peter O. Paulson, Calgary (CA); Jeffrey Chak-Fai Kwan, Mississauga (CA); Hongwei Zhang, Mississauga (CA); Ran Wu, Mississauga (CA); Xiangjie Kong, Mississauga (CA)

(73) Assignee: PURE TECHNOLOGIES LTD, Calgary (CA)

( * ) Notice: Subject to any disclaimer, the term of this patent is extended or adjusted under 35 U.S.C. 154(b) by 758 days.

(21) Appl. No.: 16/535,282

(22) Filed: Aug. 8, 2019

(65) Prior Publication Data

US 2020/0049302 A1 Feb. 13, 2020

Related U.S. Application Data

(60) Provisional application No. 62/716,085, filed on Aug. 8, 2018.

(51) Int. Cl.
*F16L 55/40* (2006.01)
*G01N 27/87* (2006.01)
(Continued)

(52) U.S. Cl.
CPC .............. *F16L 55/40* (2013.01); *G01N 27/85* (2013.01); *G01N 27/87* (2013.01); *F16L 2101/30* (2013.01)

(58) Field of Classification Search
CPC .............. G01N 27/82–83; G01N 27/87; G01N 27/90–9093; F16L 55/40; F16L 2101/30
(Continued)

(56) References Cited

U.S. PATENT DOCUMENTS

| 3,449,662 A | 6/1969 | Wood |
| 5,565,633 A | 10/1996 | Wernicke |

(Continued)

FOREIGN PATENT DOCUMENTS

| CN | 203758959 U | 8/2014 |
| EP | 0523880 | 11/1994 |
| WO | WO 2017/197505 A1 | 11/2017 |

OTHER PUBLICATIONS

Search Report and Written Opinion issued in Int'l Appl. No. PCT/CA2019/051087 (dated 2019).
(Continued)

*Primary Examiner* — Lee E Rodak
*Assistant Examiner* — Rahul Maini
(74) *Attorney, Agent, or Firm* — Barnes & Thornburg LLP

(57) ABSTRACT

Apparatus and method for detecting flaws in a wall of a metallic pipe containing a fluid are disclosed. The apparatus includes: a plurality of sensors distributed around an inner circumference of the metallic pipe, for sensing magnetic field signals from the metallic pipe; a collapsible supporting structure, including a plurality of supporting petals, at a front side of the plurality of sensors for supporting the apparatus; a sail mounted on and extended from bottom ends of the plurality of supporting petals, when the plurality of supporting petals are in an extended state, the sail is expanded to form a shape capable for containing the fluid; a processing module receiving sensed data from the plurality of sensors; and one or more battery modules for electrically powering the plurality of sensors and the processing module.

20 Claims, 11 Drawing Sheets

(51) Int. Cl.
*G01N 27/85* (2006.01)
*F16L 101/30* (2006.01)

(58) Field of Classification Search
USPC ............... 324/219–222, 227–230, 239–243
See application file for complete search history.

(56) References Cited

U.S. PATENT DOCUMENTS

| | | | |
|---|---|---|---|
| 6,239,593 B1* | 5/2001 | Burkhardt | G01N 27/9046 324/220 |
| 7,154,264 B2 | 12/2006 | Burkhardt et al. | |
| 7,402,999 B2* | 7/2008 | Plotnikov | G01N 27/902 324/220 |
| 7,683,611 B2* | 3/2010 | Burkhardt | G01N 27/82 324/220 |
| 9,599,528 B2* | 3/2017 | Di Lullo | F16L 55/40 |
| 2004/0217759 A1 | 11/2004 | Burkhardt | |
| 2016/0231277 A1* | 8/2016 | Molenda | G01N 27/9006 |
| 2017/0219527 A1* | 8/2017 | Brignac | G01N 27/902 |

OTHER PUBLICATIONS

EP Extended Search Report; 19847752.3-1001 / 3833971 PCT/CA2019051087; dated Apr. 7, 2022.

* cited by examiner

METHOD AND APPARATUS TO DETECT FLAWS IN METALLIC PIPE

RELATED APPLICATIONS

The present application claims priority from US provisional patent application No. 62/716,085, filed Aug. 8, 2018, entitled METHOD AND APPARATUS TO DETECT FLAWS IN METALLIC PIPE USING A COMBINATION OF SENSOR TYPES, which is incorporated herein by reference.

FIELD

The present application relates to metallic pipe inspection, in particular to an apparatus and a method to detect flaws in metallic pipe.

BACKGROUND

Metallic pipe is often inspected from within the pipe. For steel pipelines for oil and gas, this technique is well developed, using MFL (magnetic flux leakage), EM (electromagnetic), and Acoustic methods. Access to such pipes is usually provided through launchers and receivers built into the pipeline.

For water and wastewater pipelines, no convenient access point is normally available. Further, the existence of valves and other structures within the pipe prevents the traverse of the pipeline with any full-diameter inspection tool.

As well, when sensors of an inspection tool contact the pipe wall during the inspection, movement of the sensor on the surface of the pipe wall may create spurious noise on the recorded signals.

SUMMARY

The present application describes an apparatus which is collapsible when the apparatus passes through pipe features, such as such as bends, valves and tees. The apparatus may smoothly drift inside the pipe. The sensors are mounted on the apparatus and are placed near the surface of the inner wall of the pipe. The sensors remain stable when the apparatus travels through the pipe. The apparatus may transport various types of sensors.

The apparatus is easy to navigate through the pipeline to traverse various features such as bends and valves as described above, using the flow of the fluid inside the pipe as a means of driving force. As well, the arrangement of the sensors may also improve the accuracy of the measured signal and thus improves the accuracy of identifying the position of the defects in a pipe.

In an aspect, the present application discloses an apparatus for detecting flaws in a wall of a metallic pipe containing a fluid, comprising: a collapsible supporting structure for supporting the apparatus, wherein an axis of the apparatus is at or near an axis of the metallic pipe; a plurality of sensors for sensing magnetic field signal from the metallic pipe, the plurality of sensors configured to be distributed around an inner circumference of the pipe without contacting a surface of an inner wall of the metallic pipe; a processing module for receiving sensed data from the plurality of the sensors; and one or more battery module for electrically powering the plurality of sensors and the processing module.

In another aspect, the present application discloses a method for sensing a wall of a metallic pipe containing a fluid, comprising: positioning an axis of an apparatus at or near an axis of the metallic pipe; arranging a plurality of metal magnetic memory (MMM) sensors on the apparatus around an inner circumference of the pipe without contacting the inner circumference of the metallic pipe; driving the apparatus within the pipe by fluid flow; and sensing residual magnetic field signals generated from the wall of the metallic pipe.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Magnetic field created by stressed metallic materials may be used to assess impairment of pipeline wall strength, as disclosed in the U.S. Pat. No. 8,601,875, the contents of which is incorporated herein by reference. Villari effect can present an anomaly when the magnetometers traverse an area where the pipe wall is thinned, or stressed by bending or bedding subsidence. Deconvolution of the data or decoding of data resulting from a tethered instrument remains a challenge to using the Villari effect inside metallic pipes.

Figure 1:
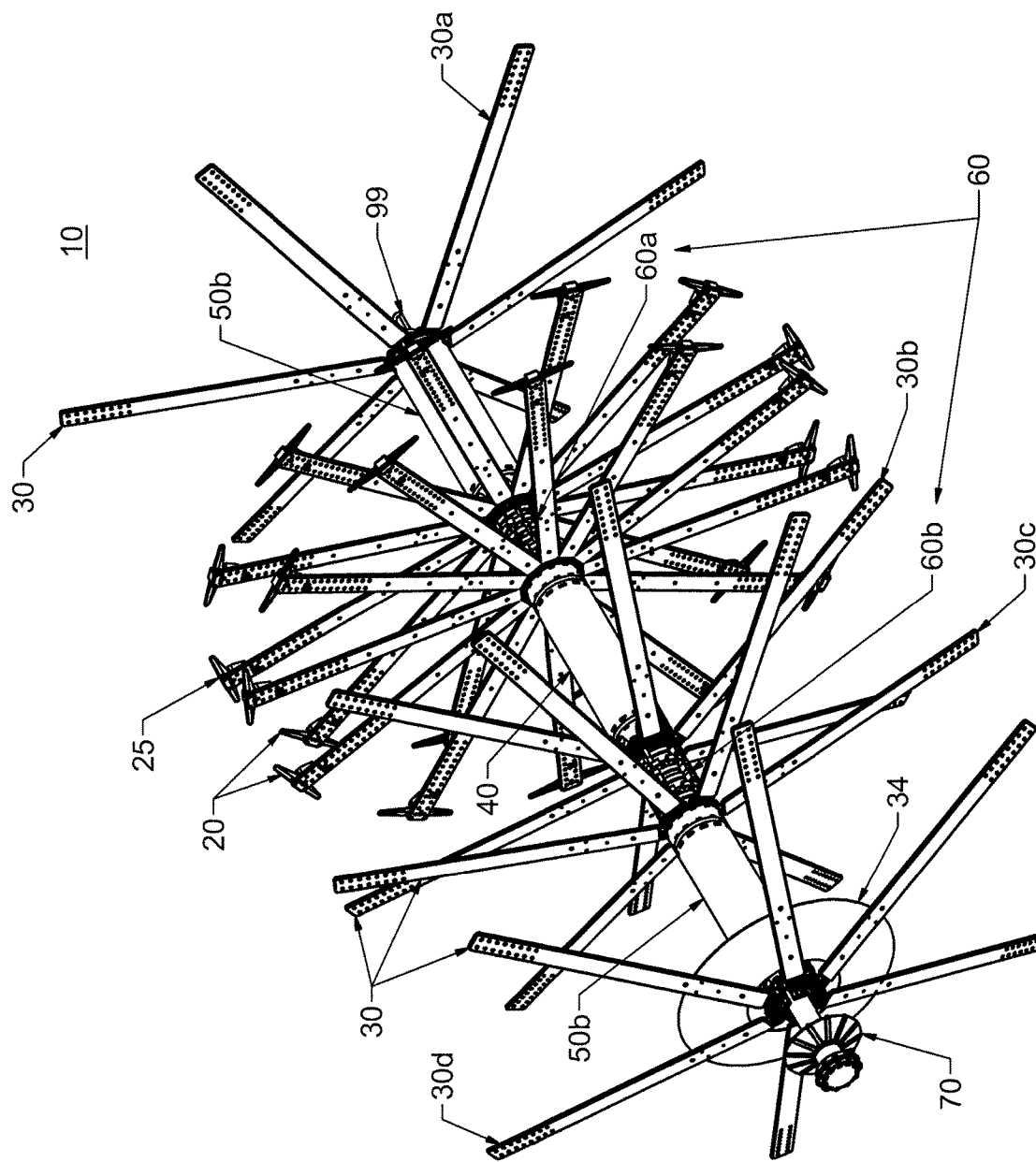
FIG. 1 is a perspective view of an apparatus, according to an embodiment of the present application.
Figure 2:
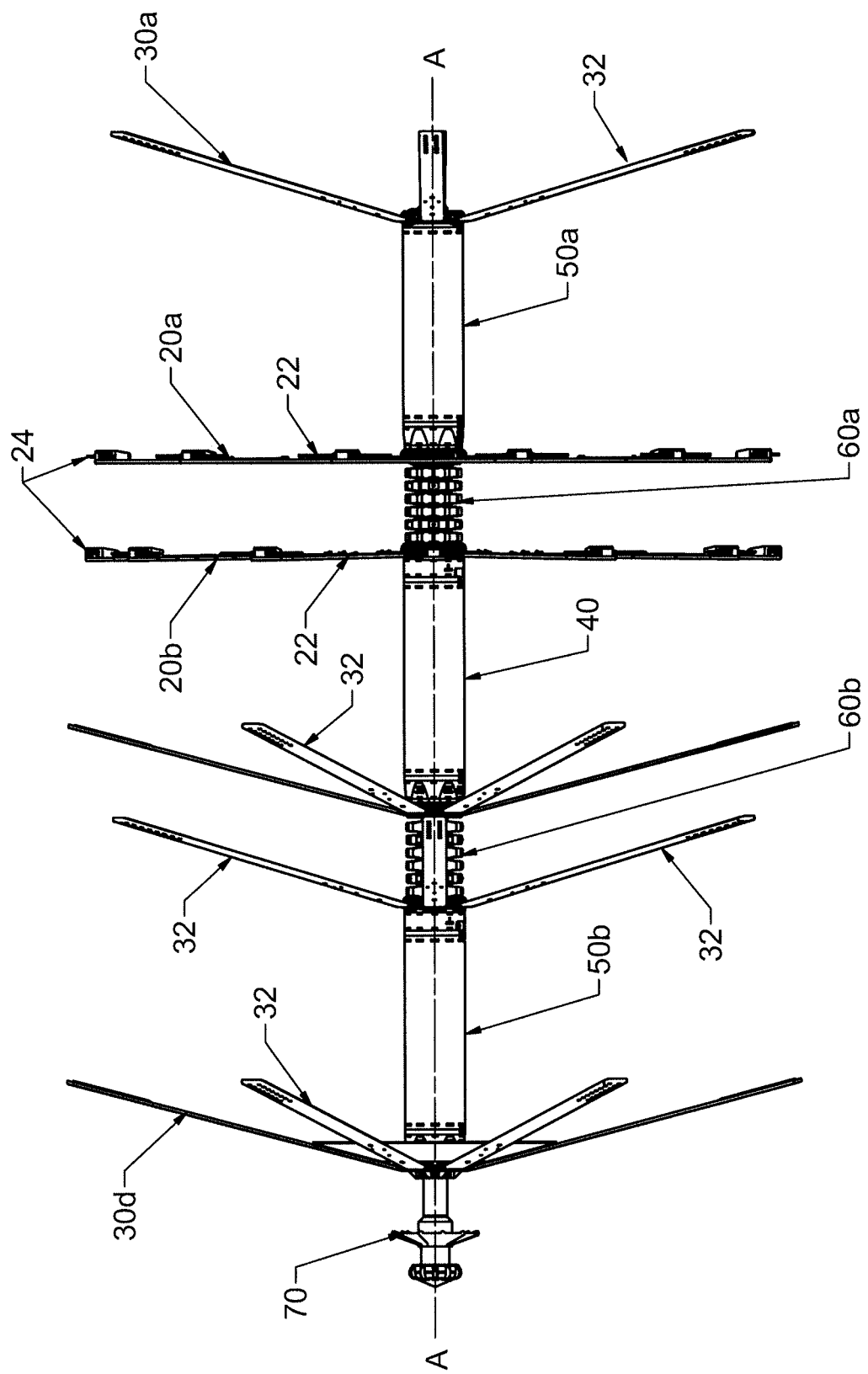
FIG. 2 is a side view of the apparatus in FIG. 1.

In the example of FIGS. 1 and 2, an apparatus 10 may be used to detect flaws in the metallic pipe when the pipe contains fluid, such as water or wastewater. Metallic pipes may be ductile iron pipes, cast iron pipes, or steel pipes. The apparatus 10 may drift smoothly along the interior of a pipe. The apparatus 10 is collapsible and may smoothly drift within the pipe when the fluid is transported within the pipe. The apparatus 10 provides a stable platform for the sensors mounted on the apparatus to maintain a stable position close to but without contacting the pipe wall while traversing the pipeline throughout the inspection.

The apparatus 10 may include one or more sensor array set 20, one or more sets of apparatus supporting structures 30, a processing module 40, one or more battery modules 50, and one or more tow links 60, and a nose module 70. The each set of the sensor array 20 and the apparatus supporting structures 30 are securely mounted at an end of processing module 40, the tow link module 60, or the battery module 50.

As illustrated in the example of FIGS. 1 and 2, each sensor array set 20, including a first set 20a and a second set 20b, may have a plurality of sensor petals 22. The sensor petal 22 may be an elongated plastic or metal bar or plate. Each sensor petal 22 has a bottom end and a top end. As illustrated in the example of FIG. 3, the bottom end of each sensor petal 22 has a petal joint 22a, and the petal joint 22a of each sensor petal 22 is molded with spring and joint at a petal plate 23.

Figure 3:
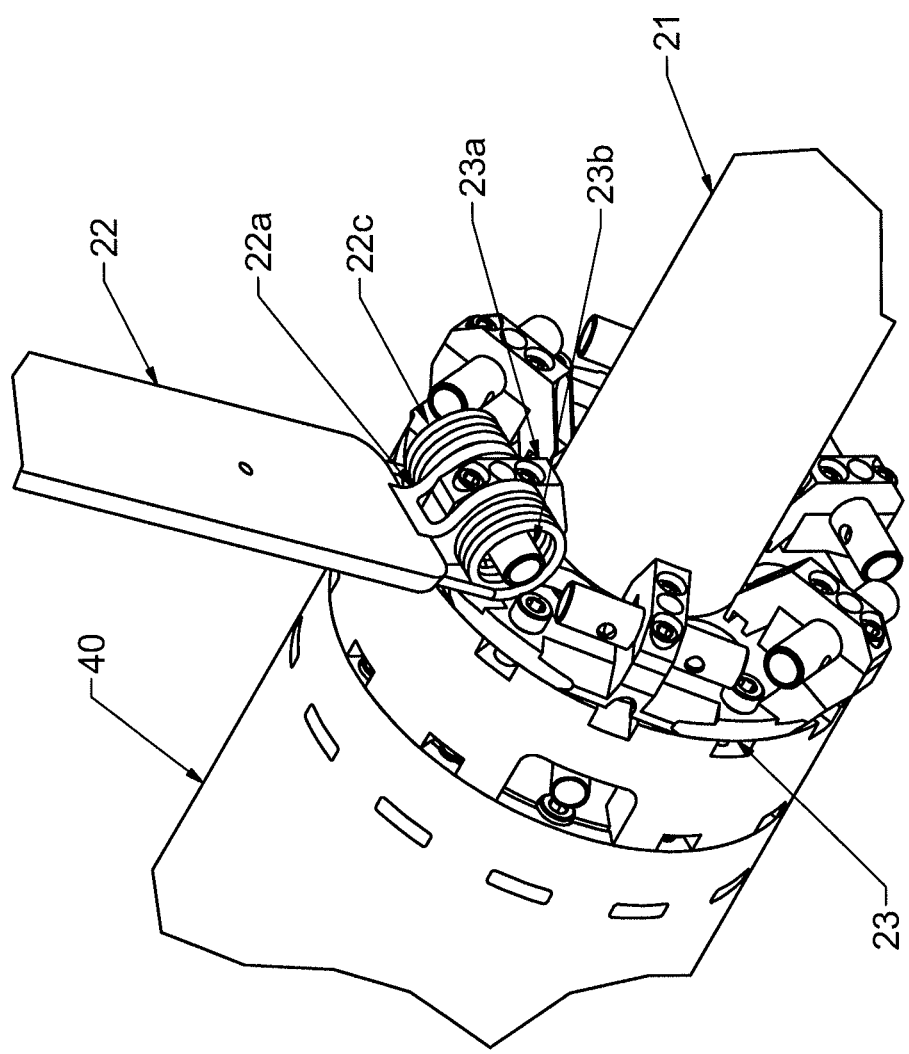
FIG. 3 is a partial perspective view of a spring loaded supporting or sensor petal of the apparatus in FIG. 1, according to an embodiment.

In FIG. 3, the petal plate 23 is securely placed on a sleeve 21 at an end of the processing module 40. The petal plate 23 may include a plurality of the petal anchors 23a and petal pins 23b. A petal joint 22a of the sensor petal 22 may be mounted on a petal anchor 23a of the petal plate 23. A petal pin 23b may be used to pivotally lock the petal joint 22a to the petal anchor 23a. A petal spring 22c may be mounted on the petal pin 23b and bias the sensor petal 22 to an extended state. When the sensor petal 22 is an extended state, the spring 22c biases the sensor petal 22 to be substantially perpendicular to the axis AA of the apparatus 10 (FIG. 2). For example, the sensor petal 22 and the axis AA may form an angle in the range of 85° to 95°. In some examples, the sensor petal 22 and the axis AA form an angle of 90°. When the apparatus 10 traverses over a pipe feature within the pipe, such as a valve, the collapsible sensor petal 22 may be compressed by the pipe feature, for example by pressing a portion above the bottom end of the sensor petal 22, to form a smaller angle, such as 0°-70°. As such, the sensor array sets 20 may traverse through the pipe feature. When the sensor petal 22 is compressed or collapsed, the spring 22c is in a compressed state. After the sensor petal 22 traverses the pipe feature, the spring biases the sensor petal 22 to the extended state. Therefore, the sensor petal 22 is collapsible at a pipe feature and resumes to the extended state after it traverses the pipe feature, due to the pivotal mechanism and the spring 22c.

Figure 5:
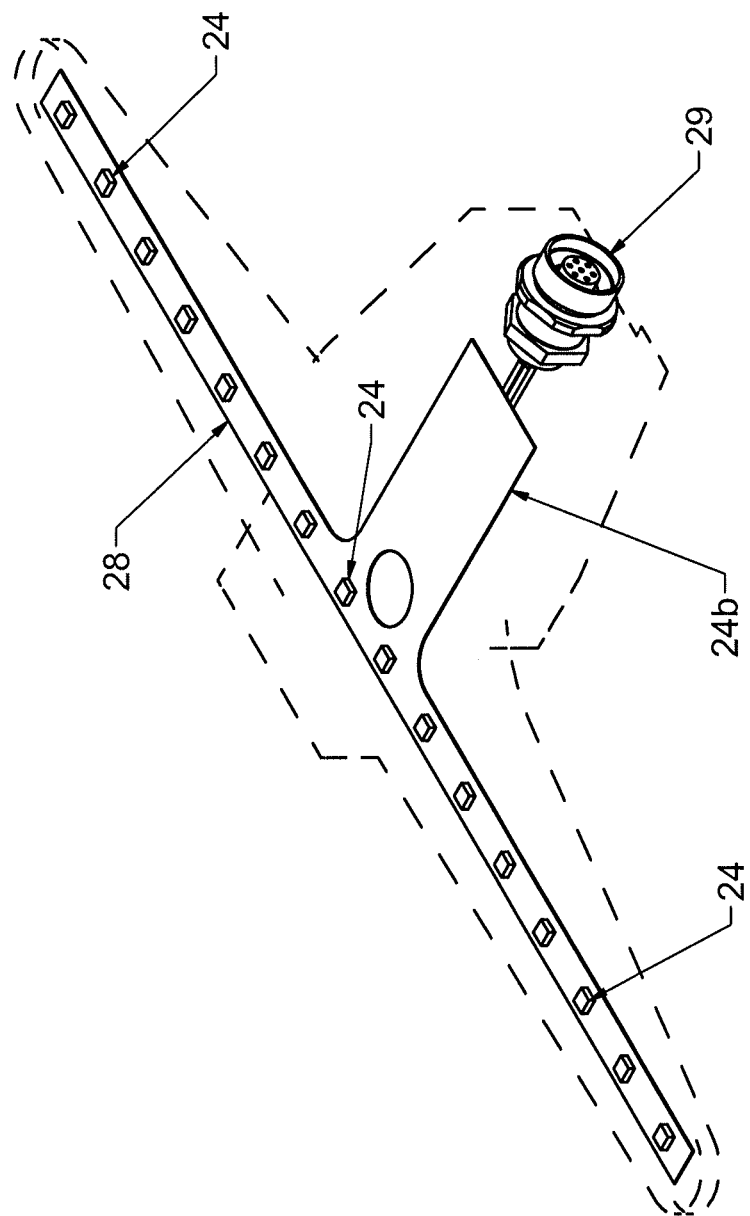
FIG. 5 is perspective view of internal structure of the sensor array in FIG. 4, according to an embodiment of the present application.
Figure 6:
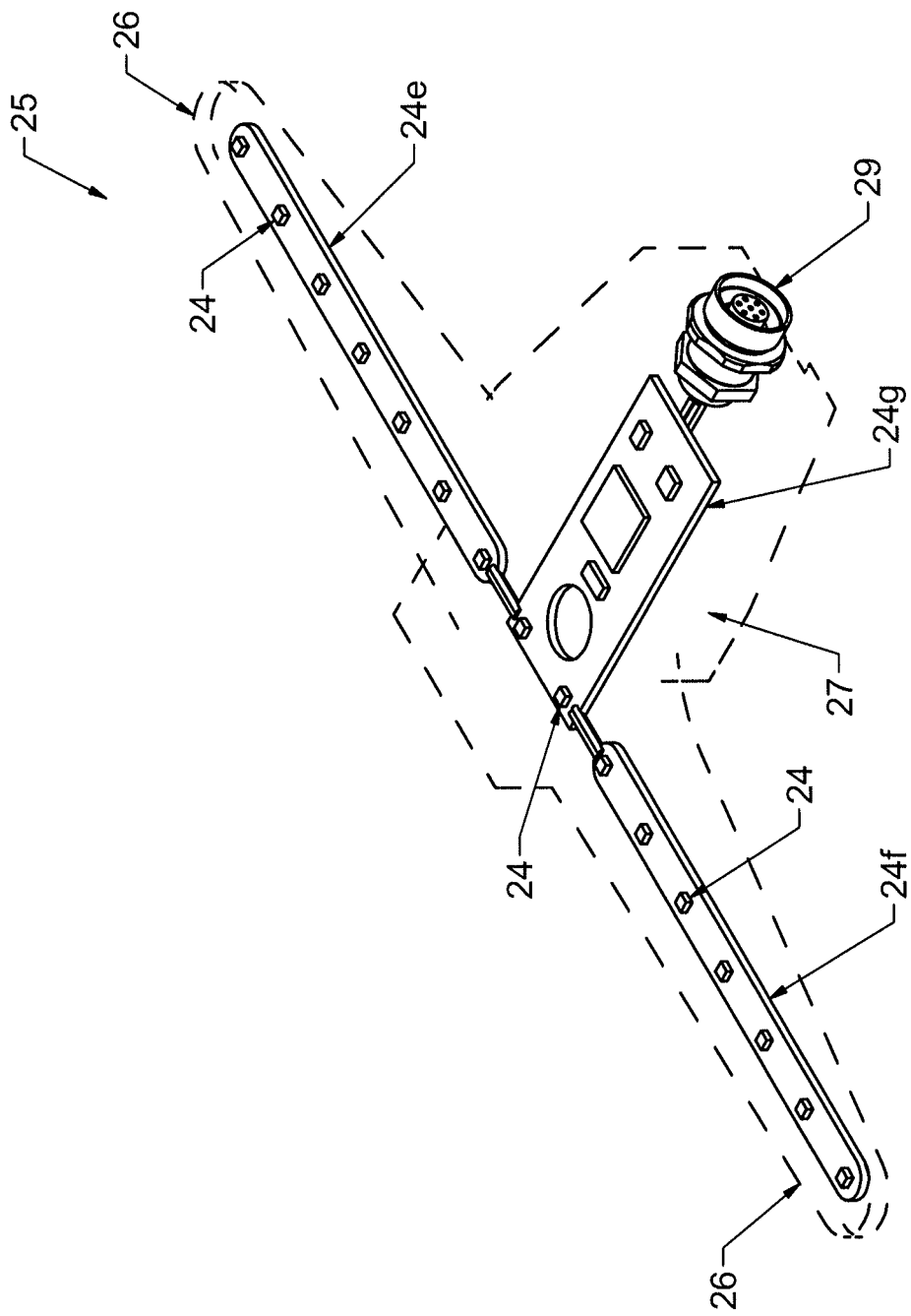
FIG. 6 is perspective view of internal structure of the sensor array in FIG. 4, according to another embodiment of the present application.
Figure 7:
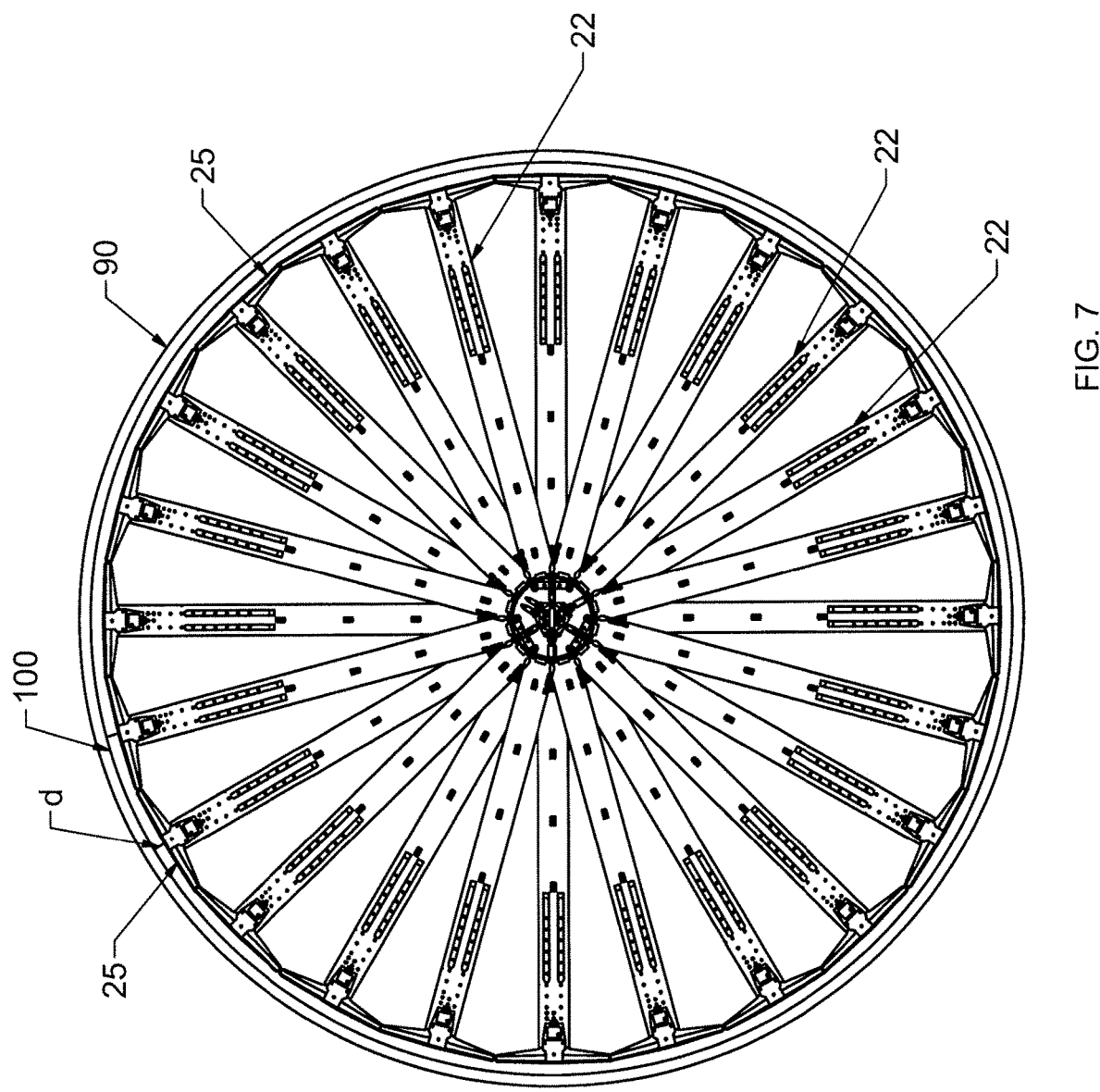
FIG. 7 is a front view of the sensor array sets of the apparatus in FIG. 1 in use within a pipe.

The top end of the sensor petal 22 securely retains a sensor array 25. The sensor array 25 may be mounted on the top end of the sensor petals 22, for example, by screws via the screw holes 29a. In some examples, one side of the sensor array 25 may be glued on one side of the top end of the sensor petals 22. In some examples, the sensor array 25 may include a plurality of sensors 24, as illustrated in FIGS. 5 and 6. The sensor petals 22 securely retain the sensor array 25 in proximity of the surface of the inner wall of a pipe without contacting the inner surface the pipe wall. As illustrated in the example of FIG. 7, the distance d between the sensor array 25 and the surface 100 of the inner wall of the pipe is in the range of 10 cm-0.5 cm. If the sensor array 25 is placed closer to the surface of the inner wall of the pipe, but without contacting the surface 100, the strength of the magnetic field signals measured by the sensor array 25 is generally stronger.

Figure 4:
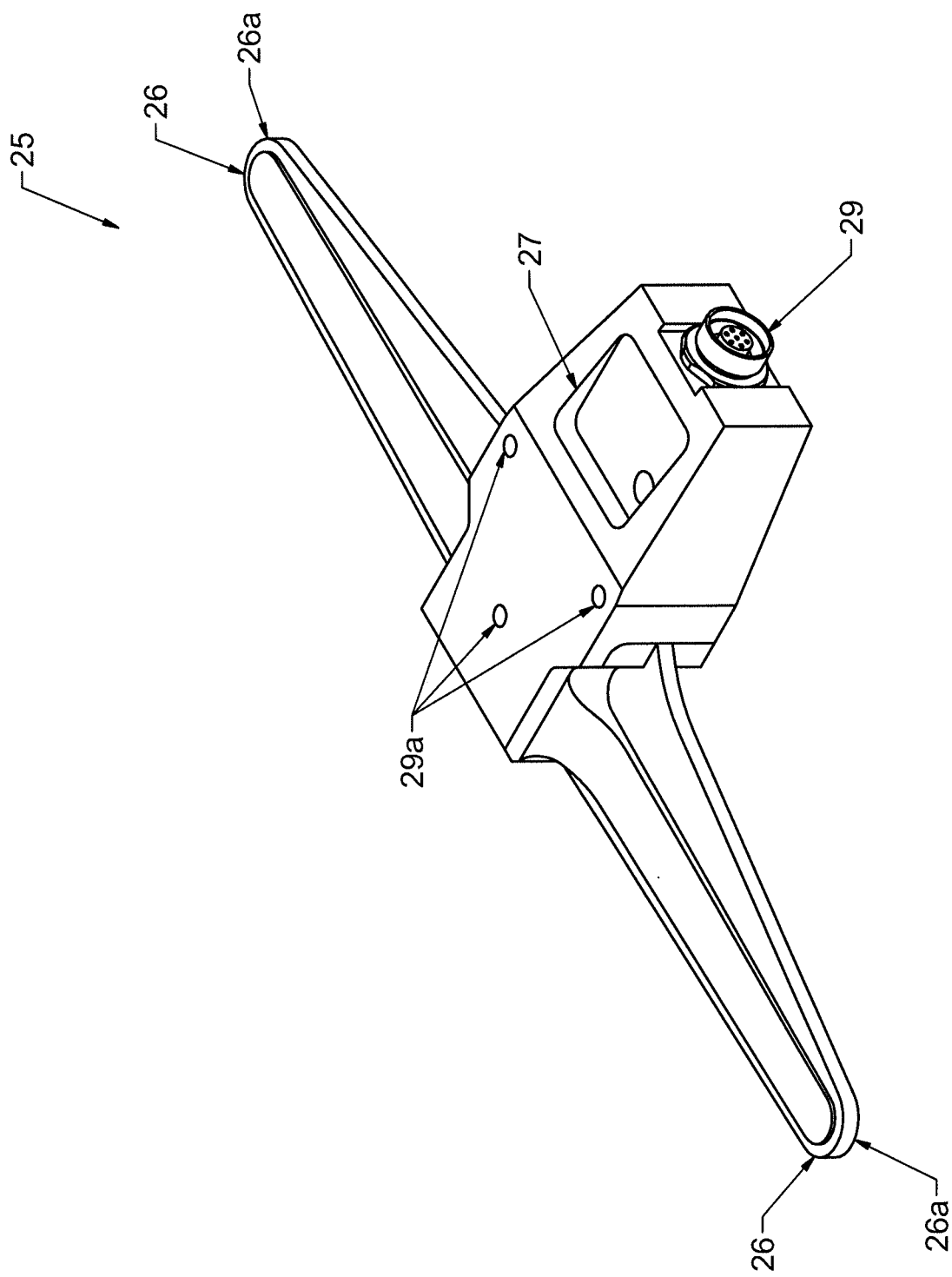
FIG. 4 is a perspective view of a sensor array in FIG. 1, according to an embodiment of the present application.

In the example of FIGS. 4-6, the sensor array 25 includes a pair of flexible arms 26, and a body 27. The body 27 includes a connector 29. The flexible arms may be made from flexible materials such as polyurethane. The pair of arms 26 extend from the opposite sides of the body 27 to form a substantially straight line. The arms 26 and the body 27 collectively house an array of sensors 24. The sensors 24 may be placed on a flexible Printed Circuit Board (PCB) 24b in the example of FIG. 5. The results measured by the sensors 24 may be transmitted, via the flexible PCB 24b, to the connector 29. The connector 29 is electrically connected with the flexible PCB 24b.

In some examples, instead of the flexible PCB 24b, in the example of FIG. 6, the sensor array 25 may include three rigid PCBs 24e, 24f and 24g. PCB 24e and 24f are housed within the two flexible arms 26, and PCB 24g is housed in the body portion of the sensor array 25. Each of the PCB 24e, 24f, and 24g may include one or more sensors 24. PCB 24e, 24f are electrically connected with PCB 24g, and PCB 24g is electrically connected with the connector 29. The measured data by sensors 24 on the PCB 24e, 24f, and 24g may be transmitted to the connector 29.

The connector 29 may be connected to a cable. The cable is connected to the processing module 40 directly or via the tow link 60a. The measured results from the flexible PCB 24b or rigid PCBs 24e, 24f, and 24g may be transmitted to the processing module 40 for processing, via the cable.

As illustrated in the example of FIG. 7, the sensor arrays 25 on the sensor petals 22 may form a continuous circumference in the proximity of the surface 100 of the inner wall of the metallic pipe. As such, the circumference of the pipe wall may be sensed in one trip of the apparatus. Continuous circumference refers to the state where each of the tip ends 26a of the pair of the sensor arms 26 is close to respective adjacent tip ends 26a of adjacent sensor arrays 25. For example, in a continuous circumference, the distance between any two adjacent tip ends 26a of adjacent sensor arrays 25 is in the range of 0-0.3 cm. In some examples, the sensor petals 22, and thus the sensor arrays 25 and sensors 24, of each set of sensor petals 22 are substantially evenly distributed around the petal plate 23. The apparatus 10 may include one or more sets of sensor petals 22 to form a continuous circumference of sensor arrays 25 in the proximity of the surface of the inner wall of the metallic pipe. The sensors 24 may substantially evenly distributed around the circumference of the surface 100 of the pipe. In the example of FIG. 1, the apparatus 10 has two sensor array sets 20a and 20b. The sensor arrays 25 formed by the sensor array sets 20a and 20b collectively cover the circumference of the surface of the inner wall of the pipe. In some examples, the apparatus 10 may include only one sensor array set, as long as the sensor array set forms a continuous circumference of sensor arrays 25.

The flexibility of the two arms 26 of the sensor array 25 reduces the chance of sensor array 25 snagging on pipeline features in an extended state. Housing the sensors 24 in the flexible arms 26 reduces the noise of the sensors 24 and thus improves the accuracy of identifying position of the defects on the pipe wall. As well, by properly selecting the length of the sensor supporting petals 22 based on the inner diameter of the pipe, the sensor array 25 may be placed close to the surface of the inner pipe wall, but not in direct contact with the pipe wall, the noise created by the scratching of the sensors 24 and surface 100 may be avoid or substantially reduced. As such, the measured data more accurately reflects the metal loss of the metallic pipe or the stress state of the metallic pipe wall. Accordingly, the arrangement of the sensor arrays 25 and the sensors in the flexible arms improves the accuracy in identifying the defects on the pipe wall.

In the example of FIGS. 5 and 6, the sensor array 25 includes 16 sensors. For example, the distance between two adjacent sensors 24 in a sensor array 25 may be 15 mm. More or less sensors 24 may be housed in the sensor array 25. If the sensor array 25 contains more sensors 24, the sensor array 25 may generate measured results with higher resolution. To increase resolution, the sensors 24 may be placed closer to each other.

The sensors 24 contained in a sensor array 25 may be electromagnetic (EM) sensors, metal magnetic memory (MMM) sensors, or combination of EM sensors and MMM sensors. MMM sensors are magnetometers that may be used to locate defects of pipes with Vallari effect.

In some examples, the EM sensors may be used alone in a sensor array 25 or a sensor array set 20a and/or 20b. The pipes may be magnetically excited, for example by magnetic field generated by a magnetic exciter, and the EM sensors may measure the strength of magnetic field excited on the pipe. The measured strength of magnetic field by the EM sensors may be used to indicate the metal loss of the metallic pipe wall. Variance of the detected signals at a particular position of the metallic pipe wall may suggest metal loss or a defect at the position of the metallic pipe wall.

Figure 8:
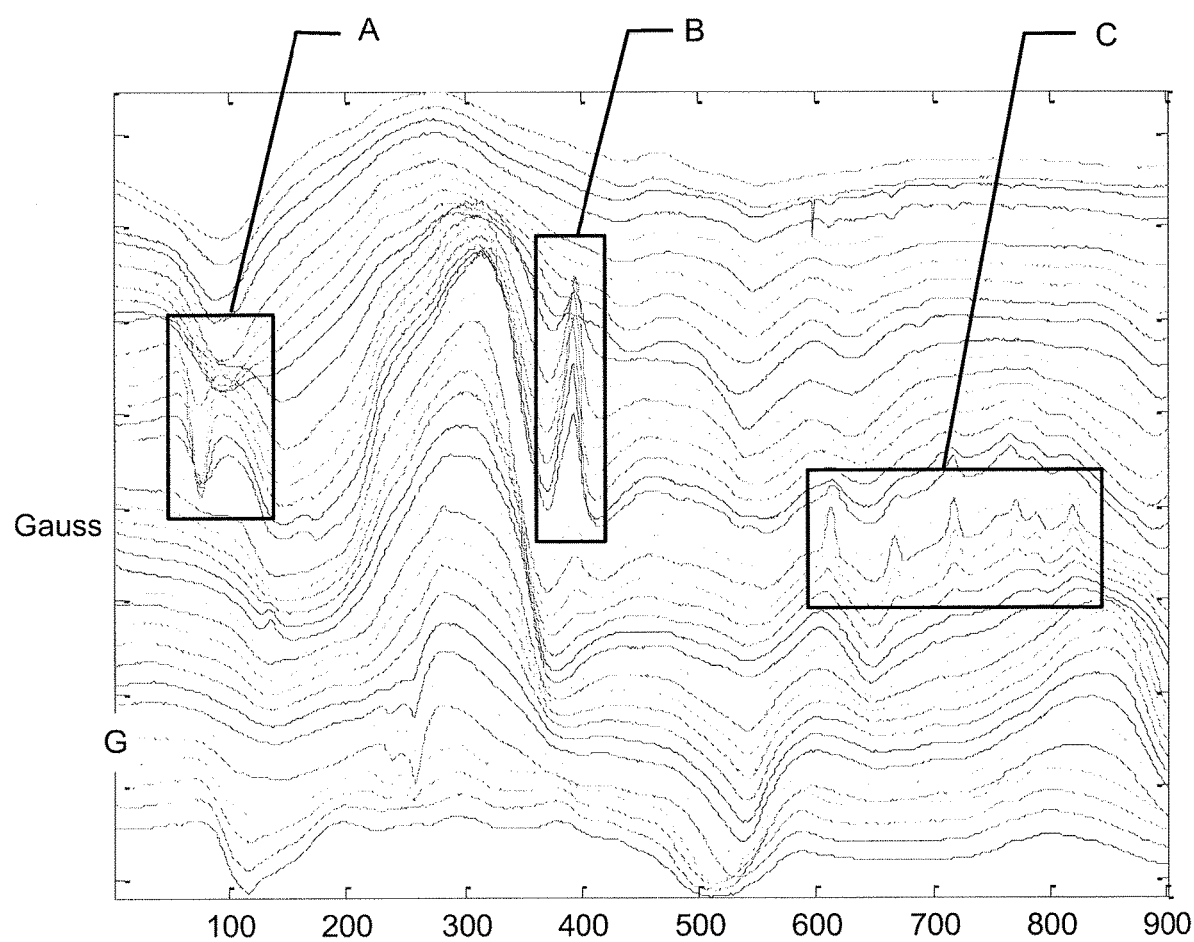
FIG. 8 is a schematic view of exemplary test results using the apparatus in FIG. 1.

In some examples, the MMM sensors may be used in a sensor array 25 or a sensor array set 20a or 20b. In this case, the pipe wall does not need to be excited. The MMM sensors may be used to measure the strength of the residual magnetic field of the pipe wall. The measured residual magnetic field may indicate stress of the metallic pipe wall, and thus to indicate the defects of the metal pipe wall. As illustrated in FIG. 8, the variances of the detected magnetic field signals at particular positions A, B, C of the metallic pipe wall suggest changes of the stress or a defect at the position of the metallic pipe wall. In FIG. 6, the horizontal axis is time, and the vertical axis shows the magnitude of the sensed magnetic signal. Position C has a smaller magnitude variance of the sensed magnetic field signals than positions A and B. This may indicate that the defect at position C has a smaller area than those at positions A and B.

If the traverse of a MMM sensor is repeated, the data created by the MMM sensor appears substantially identical from traverse to traverse. This repeatability may be used to remove false anomalies from the data because an anomaly caused by, for example, a disturbance in the traverse, the data will not be identical to other similar traverses. The repeatability therefore can be utilized in analysis to reduce the noise floor in the logged data by examining the difference between the traces taken over multiple traverses.

In some examples, the sensor array 25 or the sensor array set 20a or 20b may contain both the EM sensors and the MMM sensors. After the pipe wall is excited by magnetic field, the EM sensors may measure the strength of the magnetic field excited on the metallic pipe, and the MMM sensors may measure the strength residual magnetic field of the metallic pipe. The combination of the EM sensors and the MMM sensors may be used to more accurately detect and locate the position of the defects on the metallic pipe. For example, the MMM sensor may also assist in rejecting EM anomalies that result from spurious movement relative to the pipe wall. EM sensors may operate in close proximity to the pipe wall, and hence the data produced may be altered by small disturbances during the traverse. The temporal correlation of the appearance of anomalies on the EM sensor, and the appearance or lack of appearance of anomalies on the MMM sensor can be helpful in interpreting the source of anomalies on the EM sensors.

In an example, if the signals detected by some or all of the EM sensors indicate large anomalies at a particular location L1 in a traverse. At that same location L1, if there is no apparent anomaly on the MMM sensor(s), this may suggest that the signals detected by the EM sensors of the apparatus 10 is not disturbed because of the steady signals detected by the MMM sensor(s), and the EM sensors may have detected a circumferential joint.

In another example, EM sensors detect no anomaly at a particular point in the traverse, but MMM sensors detect an anomaly that was not present in a previous traverse. This combination might indicate that there is a new stress field developed on the pipe, but there is no apparent metal loss associated with that stress. This level of diagnostic information can be useful to a pipeline operator who might then seek to find the source of stress detected.

The apparatus 10 also includes at least two or more sets of apparatus supporting structures 30. The apparatus 10 may include at least one set of the supporting petals 30 at a front side and a rear side of the sensor petals 22. Therefore, the supporting petals 32 maintain stability of the apparatus 10 when the apparatus 10 travels within the pipe. In the example of the FIGS. 1 and 2, the apparatus 10 includes four sets of the supporting petals 30a, 30b, 30c, and 30d. the set 30a is at the rear end of the sensor petal sets 20a and 20b, and the sets 30b, 30c, and 30d are at the front end of the sensor array sets 20a and 20b. The front sets 30b and 30c provide additional support the sensor array sets 20a and 20b, and increase the stability of the apparatus 10 when they apparatus 10 travels within the pipe.

Each set of supporting structures 30 may include a plurality of supporting petals 32, such as 6 supporting petals, pivotally mounted on a petal plate 23. In some examples, the plurality of supporting petals 32 are evenly mounted on the petal plate 23. Each supporting petal 32 may be an elongated bar or plate. Each supporting petal 32 has a bottom end and a top end. Similar to the sensor petal 22, the bottom end of the supporting petal 32 may also have a petal joint and may be mounted on a petal plate 23 in the same manner as the sensor petal 22, as described above and illustrated in FIG. 3. One set of supporting petals 32 may be mounted on a petal plate 23. Similar to the sensor petals 22, a petal spring 23c biases a supporting petal 32 to an extended state. When the supporting petal 32 is in an extended state, the spring expands the supporting petal 22 to form an acute angle between the supporting petal 32 and the axis AA of the rear end of apparatus 10, for example, the supporting petal 32 and the axis AA may form an angle in the range of 65°-85°. In some examples, the supporting petal 22 and the axis AA form an angle of 75°.

The supporting petals 32 may have the same structure as the sensor petals 22 except that the supporting petals 32 is longer than the sensor petals 22. The support petals 32 may be dimensioned, when in an extended state, to be in contact with the surface of the inner wall of the pipe. In some examples, the supporting petals 32 may be sized to the correct length as per pipeline diameter. The supporting petals 32 in a set of supporting structure 30 have the same length. As such, the supporting petals 32 allow the apparatus 10 to be centralized within the pipe. The apparatus 10 is centralized within the pipe when the axis AA of the apparatus 10 is substantially at or close to the axis of the pipe. The length of the support petals 32 allow the supporting petals 32 to maintain contact with the surface 100 of the inner wall of the pipe at all time.

Contact with the surface 100 of the inner wall of the pipe and the acute angle arrangement between the supporting petal 32 and the axis AA of the rear end of apparatus 10 improves stability of the apparatus 10 when it travels within the pipe.

Similar to the sensor petals 22, when the supporting petal 32 traverses a pipe feature, such as a valve, the pipe feature presses a portion of the supporting petals 32 to cause the supporting petal 32 to collapse or fold toward the axis AA of the apparatus 10 to a compressed state. In a compressed state, the spring is in a compressed and the supporting petals 32 may pass the opening of the pipe feature. After the supporting petal 22 has traversed the pipe feature, the spring biases the supporting petal 22 to the initial extended state to contact the surface 100 of the inner pipe wall.

As illustrated in FIG. 1, the front set 30*d* may have a sail 34 extended substantially from the bottom end of the supporting petals 32. The sail 34 may be made from a flexible materials, such as plastic or fabric, and may be mounted on the supporting petals 32 for example by screws. When the front set of supporting petals 30*d* is in an extended state, the sail 34 is expanded to form a shape capable for containing the fluid, such as a dome-shaped sail. Fluid may be water or wastewater. Therefore, when the fluid in the pipe flows through the sail 34 in an extended state, the fluid generates a drag force on the sail 34. The sail 34 in turn pulls the apparatus 10 to traverse the pipe with the flow of the fluid. In some example, the apparatus 10 may travel through the pipe with a speed of 90%-95% of the flow speed of the fluid in the pipe.

Figure 9:
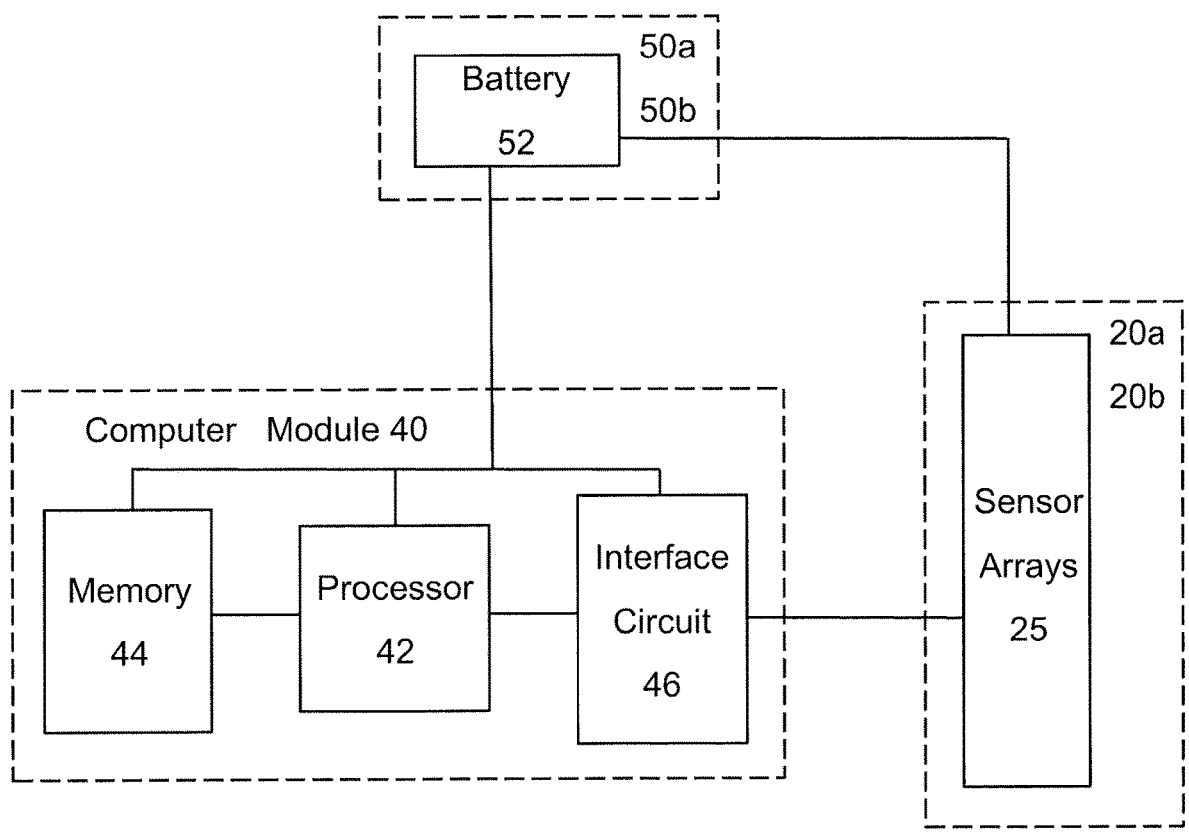
FIG. 9 is a block diagram of the processing unit, sensor array sets, and battery module of the apparatus in FIG. 1.

The apparatus 10 may include a processing module 40 for acquiring, recording and processing sensed data from the sensors 24. The processing module 40 may be mounted on a sleeve, for example by fasteners such as screws. As illustrated in the example of FIG. 9, the processing module 40 may include a processor 42, a memory 44, and an interface circuit 46. The processor 42, a memory 44, and an interface circuit 46 may be securely placed in a water-proof and corrosion-resistant plastic or metal case. The interface circuit 46 receives the sensed signals or data from the metal wall of a pipe from the sensors 24 of the sensor arrays 25. The processing module 40 may store the measured signals or data in the memory 44 for processing. The processor 42 controls the interface circuit 46 to receive the measured signals and controls the memory 44 to store the signals saved to the memory 44. The processor 42 may also process the sensed signals or data and determine the defects of the pipe. In some examples, the sensed data in the memory 44 may be exported to an external computer outside the pipe for further analysis at a later time. In some examples, the sensed data in the memory 44 are processed by the processor 42 in real time. The processor 42 may be a central processing unit (CPU) and the memory 44 may be a random-access memory (RAM), flash memory (used as secondary memory) and ROM, PROM, EPROM and EEPROM memory, dynamic random-access memory (DRAM), and fast CPU cache memory, such as static random-access memory (SRAM).

The apparatus 10 may include one or more battery modules 50. The battery modules 50 may supply electrical power to the processing module 40, and to the sensors 24 in the sensor arrays 25 via the main PCB of processing module 40. The battery modules 50 may be mounted on a sleeve, for example by fasteners such as screws. As illustrated in FIG. 9, the battery modules 50 may contain one or more batteries 52 secured in a water-proof and corrosion-resistant plastic or metal case. The batteries 52 may be Lithium-ion (Li-ion) battery, Nickel Cadmium (Ni—Cd) battery, Nickel-Metal Hydride (Ni-MH) battery, and Lead-Acid battery.

The apparatus 10 may include one or more tow links 60. The tow links 60 may connect the processing module 40 with the battery modules 50*a* and 50*b* as illustrated in FIG. 1, or connect the battery module 50*a* with the battery module 50*c*. In some example, the tow links 60 may be water-proof and corrosion-resistant plastic or metal chain links. The tow links 60 may house cables connected the connector 29 of sensor array 25 to the interface circuit 46 and provide electrical connections between the processing module 40 with the battery modules 50*a*. Each end of a tow link 60 may be secured to a sleeve. The tow links 60 are flexible and allow the apparatus 10 to traverse pipe features.

Figure 10:
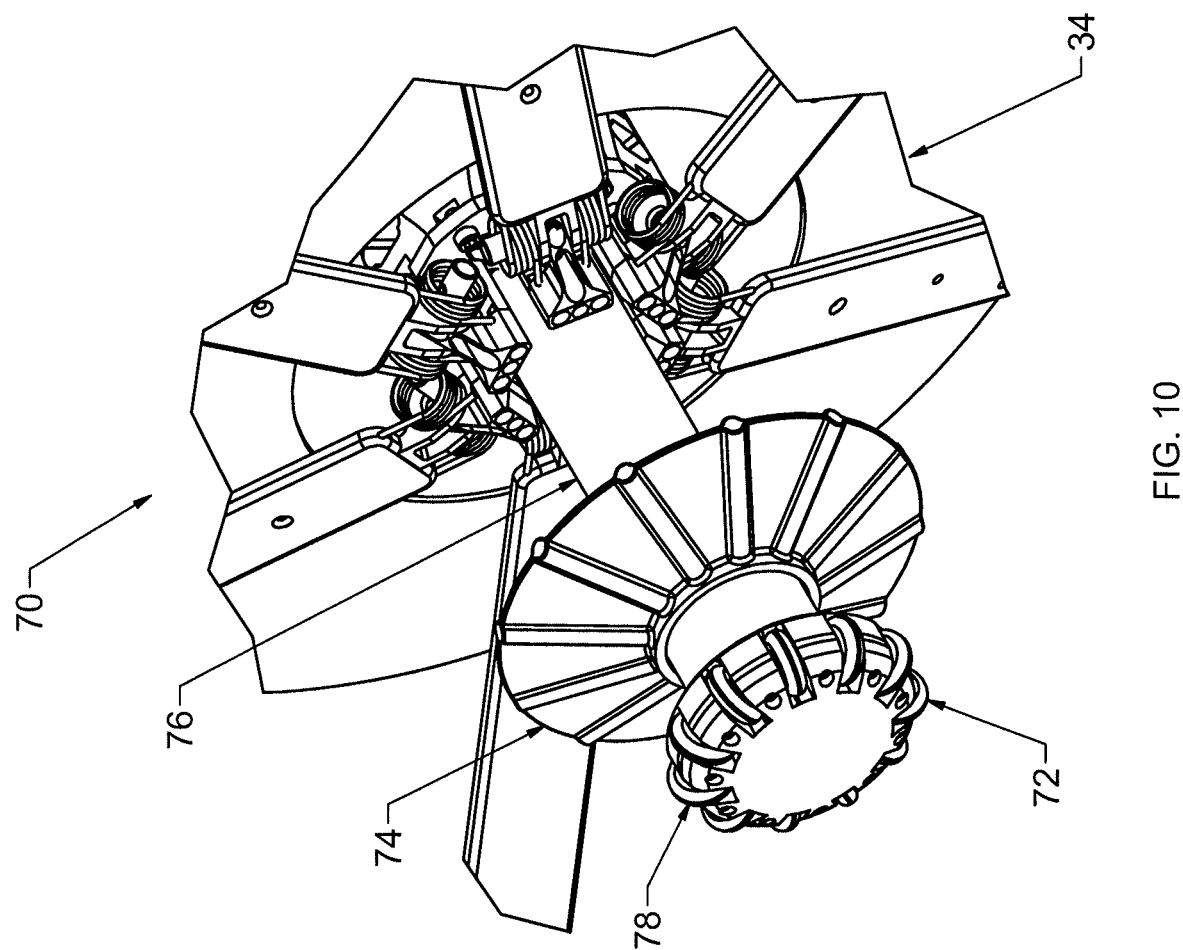
FIG. 10 is a partial perspective view of a nose module of the apparatus in FIG. 1, according to an embodiment.

As illustrated in FIG. 1, the apparatus 10 may include a nose module 70 at the front end of the apparatus 10 for assisting the apparatus 10 passing thought pipe features. In the example of FIG. 10, the nose module 70 includes a roller nose assembly 72, a deflector 74, and a flexible joint or flexible nose sleeve 76. The roller nose assembly 72 includes a plurality of rotatable roller wheels 78 at the edge of the roller nose assembly 72. When the roller assembly 72 first contacts with a pipe feature, such as elbows, butterfly valves and tees, the roller wheels 78 rotate with respect to the pipe feature. The rotation of the roller wheels 78 facilitate the apparatus 10 to slide the opening of the pipe features. The deflector 74 may be made from flexible materials, such as urethane. The defector 74 facilitate compression the nose module 70 further to direct the apparatus 10 towards the opening of the pipe feature and prepare the allow the pipe feature to collapse the subsequent supporting petals 32 and the sensor petals 22 by compressing them at the portion above the respective bottom end. The flexible nose sleeve 76 allows the nose module 70 tilt off the pipe feature.

In some examples, the apparatus 10 may include an attachment 99, as illustrated in FIG. 1, such as tow ring attachments, mounted at the rear end of apparatus 10. The attachment 99 provides a connecting point for pulling, lifting, and winching the apparatus 10 by a person or a cart inside the pipe.

The configuration of apparatus 10 may be varied. For example, the apparatus 10 in FIGS. 1 and 2 may only include two sets of supporting petals 30*a* and 30*d*, or only one of the battery modules 50*a* and 50*b*, or only one of the tow links 60*a* and 60*b*. As well, the apparatus 10 may include additional sets of supporting structures 30, battery modules 50, and tow links 60. For example, the apparatus in FIG. 11 includes additional sets of supporting structure 30*e* and 30*f*, additional tow link 60*c*, and additional battery module 50*c*. As well, the additional battery module 50*c* may extend the runtime of the apparatus 10 in inspecting pipes.

Figure 11:
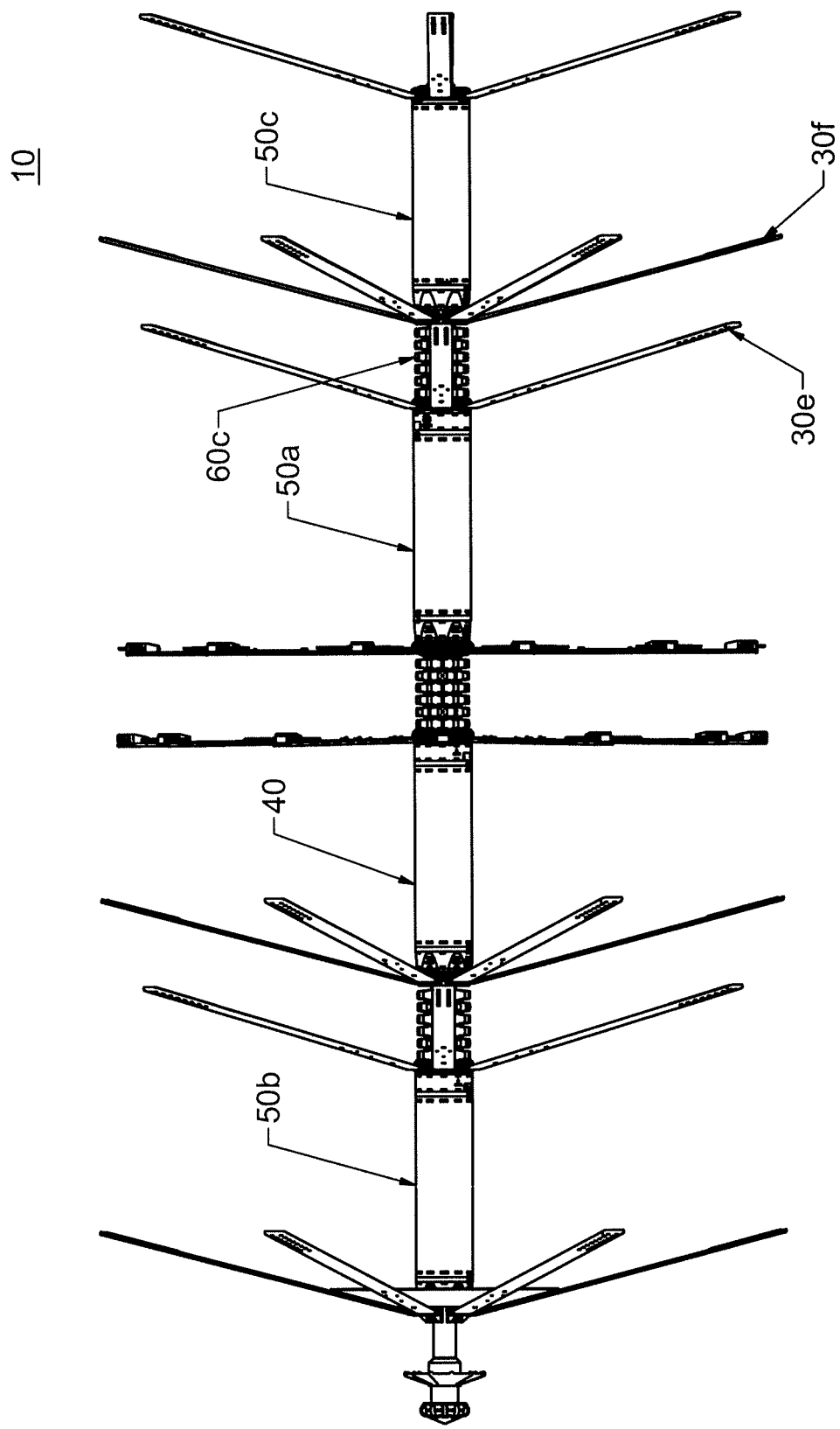
FIG. 11 is a front view of an apparatus, according to another embodiment of the present application.

To maintain dynamic stability of the apparatus 10 in the pipe, the overall length of apparatus 10 may be at least 1.5 times of the pipe diameter. A greater overall length of the apparatus 10 may improve the stability of the apparatus 10 when it travels within the pipe. The overall length of the apparatus 10 may be adjusted. In some examples, the length of the individual modules may be adjusted, such as the processing module 40, the battery module 50, the tow link module 60, and the nose module 70. In some examples, the additional battery modules 50 and tow link modules 60 may be added to increase the overall length of the apparatus 10', as illustrated in the example of FIG. 11.

In use, the supporting petals 32 and sensor petals 22 are collapsed to a folded state when the apparatus 10 is placed inside the pipe through a manway. After the apparatus 10 has been placed within the pipe, the supporting petals 32 and sensor petals 22 are extended in an extended state. The drag force generated on the apparatus 10 by the flow of the fluid within the pipe allows the apparatus 10 to drift with the flow. The sensor arrays set 20 may sense the magnetic signals when the apparatus 10 travels within the pipe.

As the apparatus 10 passes over a pipe joint, the MMM sensors 24 on the sensor array set 20 may sense a shift in the magnetic field signals due to the residual stress from the weldment. The shift of the magnetic field also signifies the location of the pipe joint, and is distinguishable from a localized defect signal. When the apparatus 10 encounters a pipe feature, such as a manway, valve, bend, tee, or reducer, the apparatus 10 may drift through these pipe features as described above.

For example, the apparatus 10 may traverses a butterfly valve. The apparatus 10 approaches the valve at about 90 to 95% of the flow velocity. The apparatus 10 first makes contact at roller nose assembly 72 with the valve plate. The roller wheels 78 rotate in relation to the valve. The flexible nose sleeve 76 with the rotation of the roller wheels 78 causes the nose 70 tilt off the valve. The deflector 74 then makes contact with the valve and facilitate compression the nose 70 further to direct the apparatus 10 towards the opening of the valve. As the apparatus 10 moves forward, the valve compresses the supporting petals 32 and sensor petals 22 to cause the supporting petals 32 and sensor petals 22 to collapse to the extent necessary to pass the valve. The drag force of the fluid flow in the pipe on the sail 34 pulls the apparatus 10 through the valve. Once the apparatus 10 passes the valve, the supporting petal 32 and sensor petals 22 expand to the respective extended state and resume the data scanning.

If the measured signals indicate a defect, the location of the defect may be identified by counting the joints of the pipe as signified by the shifts of the magnetic field signals, the time unit of the signal, and the speed of the apparatus 10 which is constant when the apparatus travels within the pipe. By counting the joint signals in the measured data, the defect signals may be correlated to a specific location along the inspected pipe length. For example, with the parameters of the location of the joint identified by the shifts, the traveling speed of apparatus 10, the location of a defect may be determined based on the time units spent from the location of a join to the measured signals indicating the defect.

Previous method to inspect the defects on metallic pipe with internal full diameter tools, smart pigs, uses magnetic flux leakage where a pipe section needs to be excavated and removed to gain access to insert and remove the tool. Unlike previous method, the apparatus 10 is easy to enter and exit through existing manways by folding the supporting petals 32 and sensor petals 22, and easy to navigate through the pipeline to traverse various features such as bends and valves as described above, using the flow of the fluid inside the pipe as a means of drive force. As well, the arrangement of the sensors also improves the accuracy of the measured signal and thus improves the accuracy of identifying the position of the defects in a pipe.

Certain adaptations and modifications of the described embodiments can be made. Therefore, the above discussed embodiments are considered to be illustrative and not restrictive.

The invention claimed is:

1. An apparatus for detecting flaws in a wall of a metallic pipe containing a fluid, comprising:
 a plurality of sensors for sensing magnetic field signals from the metallic pipe, the plurality of sensors configured to be distributed around an inner circumference of the metallic pipe without contacting a surface of an inner wall of the metallic pipe;
 a collapsible supporting structure at a front side of the plurality of sensors for supporting the apparatus, wherein the collapsible supporting structure comprises a plurality of supporting collapsible petals;
 a collapsible sail mounted on and extended from bottom ends of the plurality of collapsible supporting petals, wherein when the plurality of collapsible supporting petals are in an extended state, the collapsible sail is expanded to form a shape capable for containing the fluid, and wherein the plurality of collapsible supporting petals collapse to a compressed state and cause the collapsible sail to compress;
 a processing module for receiving sensed data from the plurality of sensors; and
 one or more battery modules for electrically powering the plurality of sensors and the processing module.

2. The apparatus of claim 1, further comprising a nose module for facilitating the apparatus to pass through an opening of a pipe feature.

3. The apparatus of claim 1, wherein the plurality of sensors comprise a plurality of sensor arrays, and wherein each sensor array of the plurality of sensor arrays includes a subset of the plurality of sensors.

4. The apparatus of claim 3, wherein each of the plurality of sensor arrays comprises 16 sensors.

5. The apparatus of claim 4, wherein the distance between the plurality of sensors is about 15 mm.

6. The apparatus of claim 3, wherein the subset of the plurality of sensors are mounted on a flexible Printed Circuit Board (PCB).

7. The apparatus of claim 3, wherein the subset of the plurality of sensors are mounted on three rigid Printed Circuit Boards (PCBs).

8. The apparatus of claim 6, wherein each of the plurality of sensor arrays includes a body and a pair of flexible arms extended in opposite directions from the body, and wherein the flexible PCB and the subset of the plurality of sensors are mounted within the pair of flexible arms.

9. The apparatus of claim 8, wherein the body further comprises a connector for transmitting the sensed data to the processing module.

10. The apparatus of claim 3, wherein each of the plurality of sensor arrays is mounted on a top end of a sensor petal.

11. The apparatus of claim 10, wherein the sensor petal is pivotably mounted on a petal plate, wherein the sensor petal is configured in an extended initial state.

12. The apparatus of claim 3, wherein the plurality of sensor arrays form a continuous circumference in proximity of the surface of the inner wall of the metallic pipe.

13. The apparatus of claim 12, wherein the plurality of sensor arrays are evenly distributed on the continuous circumference.

14. The apparatus of claim 12, wherein a distance between the sensor arrays and the surface of the inner wall of the metallic pipe is in the range of 10 cm-0.5 cm.

15. The apparatus of claim 3, wherein the plurality of sensors are included in two sensor array sets.

16. The apparatus of claim 11, wherein the sensor petal is substantially perpendicular to an axis of the apparatus when the sensor petal is in the extended initial state.

17. The apparatus of claim 11, wherein the sensor petal is collapsible when the apparatus passes through an opening of a pipe feature.

18. The apparatus of claim 1, wherein the plurality of sensors comprise metal magnetic memory (MMM) sensors.

19. The apparatus of claim 1, further comprising at least one tow link for connecting the processing module with the one or more battery modules, or for connecting two battery modules.

20. A method for sensing a wall of a metallic pipe containing a fluid, comprising:
 positioning within the metallic pipe;

arranging a plurality of metal magnetic memory (MMM) sensors on the apparatus around an inner circumference of the metallic pipe without contacting the inner circumference of the metallic pipe;

supporting, by a collapsible supporting structure, the apparatus at a front side of the plurality of MMM sensors, wherein the collapsible supporting structure comprises a plurality of collapsible supporting petals;

driving, by a collapsible sail mounted on and extended from bottom ends of the plurality of collapsible supporting petals, the apparatus within the metallic pipe by fluid flow, wherein when the plurality of collapsible supporting petals are in an extended state, the sail is expanded to form a shape capable for containing the fluid, and wherein when the plurality of collapsible supporting petals traverse a pipe feature, the plurality of collapsible supporting petals collapse to a compressed state and cause the collapsible sail to compress; and sensing residual magnetic field signals generated from the wall of the metallic pipe.

\* \* \* \* \*